March 20, 1951 E. G. BAILEY ET AL 2,546,119
CONTROL SYSTEM

Original Filed Oct. 18, 1943 5 Sheets-Sheet 1

Inventors
ERVIN G. BAILEY
AND PAUL S. DICKEY

By Raymond W. Jenkins
Attorney

March 20, 1951 E. G. BAILEY ET AL 2,546,119
CONTROL SYSTEM

Original Filed Oct. 18, 1943 5 Sheets-Sheet 2

Inventors
ERVIN G. BAILEY
AND PAUL S. DICKEY
By Raymond W. Jenkins
Attorney

March 20, 1951 E. G. BAILEY ET AL 2,546,119
CONTROL SYSTEM
Original Filed Oct. 18, 1943 5 Sheets-Sheet 3

FIG. 6

Inventors
ERVIN G. BAILEY
AND PAUL S. DICKEY
By Raymond D. Junkins
Attorney

March 20, 1951    E. G. BAILEY ET AL    2,546,119
CONTROL SYSTEM Original Filed Oct. 18, 1943          5 Sheets-Sheet 5

FIG. 9

Inventors
ERVIN G. BAILEY
AND PAUL S. DICKEY
By Raymond W. Jenkins
Attorney

Patented Mar. 20, 1951

2,546,119

UNITED STATES PATENT OFFICE 2,546,119

CONTROL SYSTEM

Ervin G. Bailey, Easton, Pa., and Paul S. Dickey, East Cleveland, Ohio, assignors, by mesne assignments, to The Babcock & Wilcox Company, New York, N. Y., a corporation of New Jersey Original application October 18, 1943, Serial No. 506,630. Divided and this application December 9, 1946, Serial No. 715,044

9 Claims. (Cl. 263—19)

The present invention relates in general to the operation and control of fluid heaters of the type in which the heat transfer medium consists of a fluent mass of refractory material which is first heated by the passage of a heating fluid in heat transfer relation therewith and then cooled by contact with a second fluid to be heated; and more particularly to fluid heaters of the character illustrated and described in which the fluent mass of heat transfer material moves downwardly through superposed heating and cooling chambers connected by a neck or throat of reduced flow area.

The general object of our invention is the provision of a method of and apparatus for operating and controlling fluid heating apparatus of the character disclosed for continuously heating the fluid under pressure at high capacities to a uniform final temperature in a range whose upper temperature limit is dependent only upon the physical properties, such as the fusing temperature, of the refractory materials employed, with little or no contamination of the fluid being heated by the heating fluid employed and vice versa, without subjecting any included metallic parts to unsafe operating temperatures or requiring special corrosion and heat resistant alloys for metal operating temperatures above 900° F., and with a relatively high overall thermal efficiency.

A further object is the provision of a method and apparatus for automatically controlling the operation of such a fluid heater to provide continuous uniform leaving temperature of the heated material under continuous or varying rates of operation as may be desired.

Another object of our invention is the provision of method and apparatus for safely operating such a fluid heater at different rates of operation. Such a system includes protective and interlock apparatus sensitive to emergency or adverse conditions, for protecting not only the heater but to insure against producing a heated fluid of a temperature dangerously above or below the optimum value.

The construction and arrangement of the fluid heater here under consideration, as well as its general mode of operation, is disclosed in the copending application of Ervin G. Bailey and Ralph M. Hardgrove, Serial No. 502,580, now Patent No. 2,447,306, to which reference may be had for a fuller explanation of those features of construction and operation which are not a part of the present invention.

Our present invention particularly encompasses certain preferred methods of and apparatus for controlling the operation of such a fluid heater as is described in said copending application of Bailey and Hardgrove. The features of novelty which characterize our present invention are pointed out with particularity in the claims annexed to and forming a part of this specification. For a better understanding of the invention, its operating advantages and specific objects attained by its use, reference should be had to the accompanying drawings and descriptive matter in which we have illustrated and described preferred embodiments of our invention.

Figs. 1, 2, 3, 4 and 5 substantially duplicate figures of the same numbers in the copending Bailey and Hardgrove application. In view of the reference to this application it is not deemed necessary here to include a lengthy description of the construction and general mode of operation of the referred to types of fluid heater. While in its broader aspects our present invention is adapted for the use of liquid and gaseous fluids as the heated and/or heating fluids, the method and apparatus of our invention are particularly adapted for the use of high temperature gases as the heating fluid and a gaseous fluid, such as a gas, vapor or finely divided solid in suspension, as the fluid to be heated to a high temperature.

Figures 1, 2, 7:
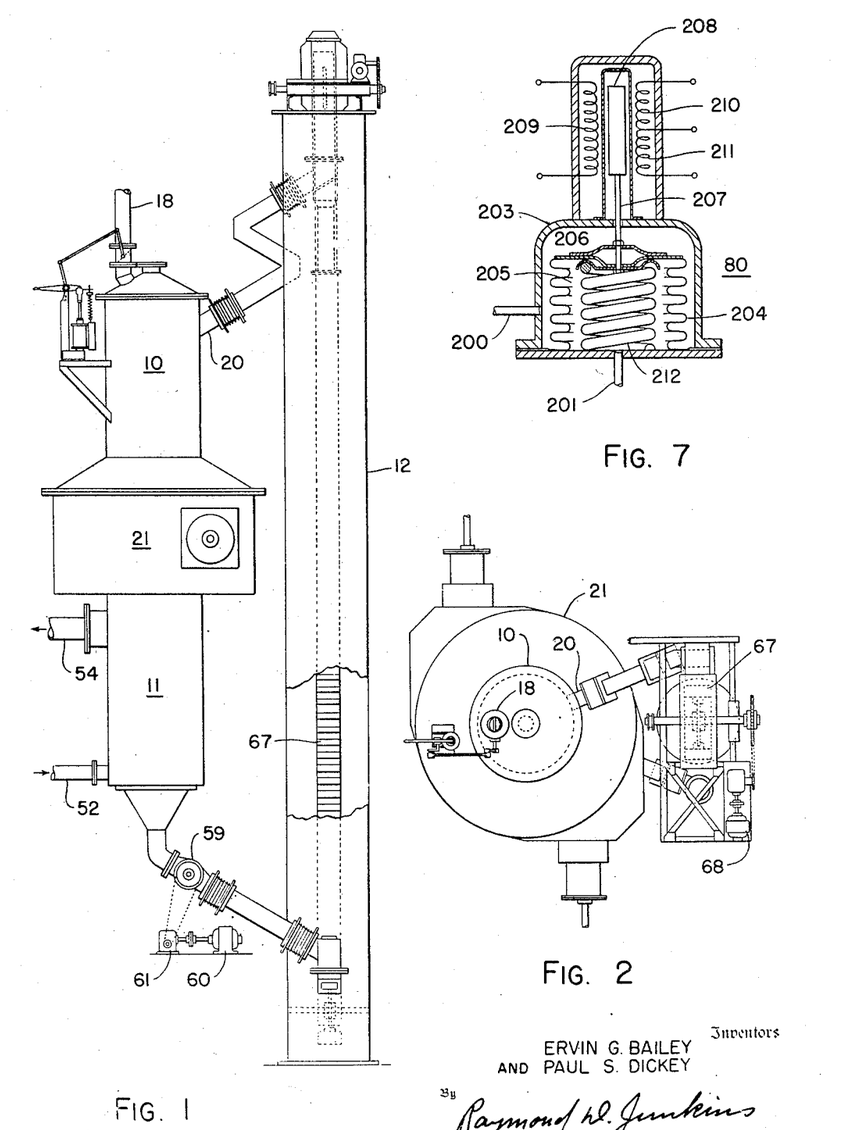
Fig. 1 is an elevation, partly in section, of a pilot plant unit constructed in accordance with the invention of Bailey and Hardgrove, the structural supports being omitted for purposes of clarity.
Fig. 2 is a plan view of the apparatus shown in Fig. 1.
Fig. 7 is a sectional elevation, partially diagrammatic, of a pressure differential responsive device.

The heating unit illustrated in the drawings is constructed and designed for the use of gaseous heating and heated fluids under pressure, and as shown comprises as its main part an upper heating chamber 10 normally partly filled with a downwardly moving fluent mass of refractory heat transfer material 14 to be heated by high temperature gases while passing therethrough. There is shown a connected subjacent heat absorbing or reaction chamber 11 arranged to receive, and normally substantially completely filled with, heated refractory material 14 from the upper chamber and in which the heated refractory material is utilized for heating a second fluid, in the present embodiment a gaseous fluid, to a predetermined temperature. An elevator 12 is provided receiving the cooled refractory material from the lower chamber 11, returning it to the upper part of the upper chamber 10, and a control system providing automatic control means for regulating operating conditions in the system.

An annular combustion chamber 21 is provided having an annular passage 28 comprising an outlet from the combustion chamber for the heated products of combustion to the fluent mass of material 14. While various fuels can be burned in the combustion chamber 21 to provide the desired supply of high temperature gases, or flue gases from other apparatus introduced as a source of heat, a gaseous fuel is used in the embodiment illustrated. Tangential burners are arranged in diametrically opposite parts of the combustion chamber wall. An air supply connection 34 and a fuel supply 38 provide the elements of combustion to the burners. A valve controlled supply pipe 40 permits additional combustion air or recirculated flue gas to be supplied in variable amounts for tempering the heating gases generated.

Figure 5:
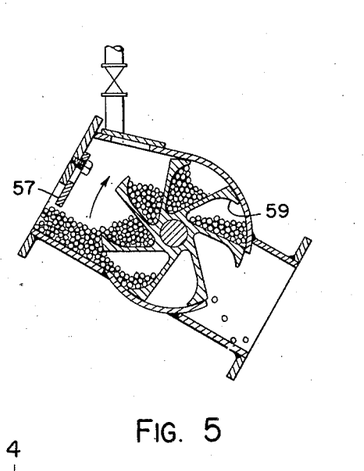
Fig. 5 is an enlarged view of part of the apparatus shown in Fig. 3.

The circular cross-section of the upper chamber 10 is progressively decreased to the upper end of a neck or throat passage 42 connecting the chambers 10 and 11. The lower or heat absorbing chamber 11 is of substantially uniform circular horizontal cross-section having near its lower end a valve controlled fluid inlet 52. A gaseous fluid outlet 54 is formed in the upper part of the chamber 11 above the normal level of the fluent mass of material therein. The discharge of refractory material from the chamber 11 is controlled by an adjustable inclined gate 57 at the entrance of a variable speed fluid sealing material discharge device, such as a multi-pocket rotary feeder 59 driven by a variable speed electric motor 60 through a speed reducer 61, as shown in Figs. 1 and 5. The fluent mass of material preferably moved at a relatively uniform rate downwardly through the chamber 10, the throat 42, and the chamber 11, is desirably a high refractory material formed in pellets of approximately one-half inch in diameter.

The feeder 59 empties into the lower inlet of an elevator 12 returning the pellets to the upper inlet pipe 20 of the chamber 10. Speed of the buckets 67 may be controlled by varying the speed of the driving electric motor 68 or through variation of a gear reduction between the two.

Figure 3:
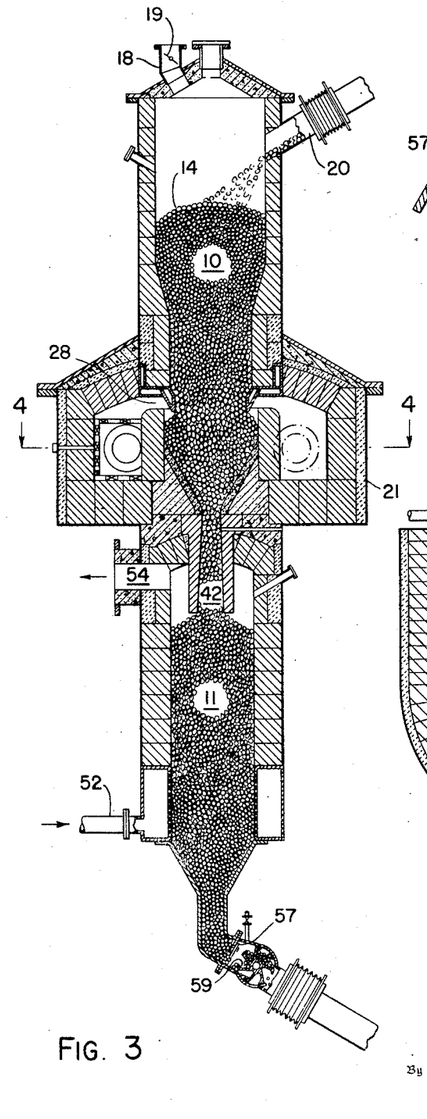
Fig. 3 is an enlarged sectional elevation of a portion of the apparatus shown in Fig. 1.
Figure 4:
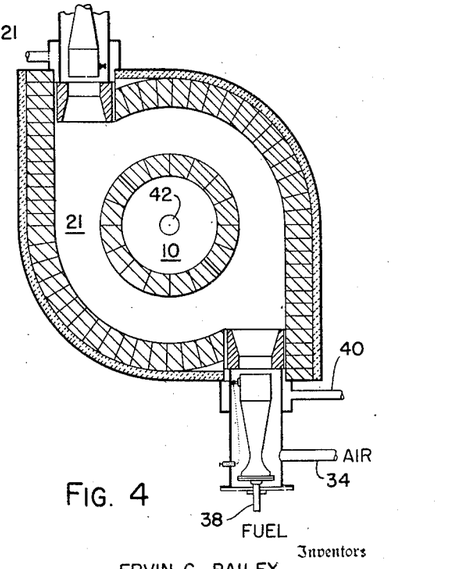
Fig. 4 is a horizontal section taken on the line 4—4 of Fig. 3.

In the normal operation of the apparatus described the chambers 10 and 11 and throat 42 are filled with refractory pellets of the desired size and shape to approximately the levels indicated in Fig. 3. The fluent mass of pellets moves continuously downward through the upper chamber, throat, and lower chamber in series, at a relatively slow rate controlled by the position of the gate 57 and the speed of the feeder 59. The desired shape of these chambers and throat causes all portions of the pellet column to move downwardly continuously as long as the feeder is in operation. Fuel is fired in the combustion chamber 21 and the heating gases generated flow through the annular inlet 28 into the lower part of the upper chamber 10, passing upwardly through the interstices in the fluent mass in intimate counter-flow contact with the descending pellets, whereby the pellets are efficiently heated to a high temperature and the gases leave through the heating gas outlet 18 at a relatively low temperature. The highly heated pellets move downwardly in a column through the throat 42 into the lower chamber 11. The gaseous fluid to be heated, such as air, steam, naptha, etc., is introduced into the chamber 11 through the conduit 52 under a predetermined pressure, passing upwardly through the interstices between the descending pellets in the chamber 11 where it is heated in counterflow heat transfer, and passes out at the desired temperature through the outlet 54. The pellets discharge through the feeder 59, are elevated by the elevator 12, and reenter the chamber 10 through the opening 20.

The relative pressure in the chambers 10 and 11, as well as the flow between the chambers 10 and 11, or lack of flow, is controlled by provisions disclosed in the said Bailey and Hardgrove application.

Figure 6:
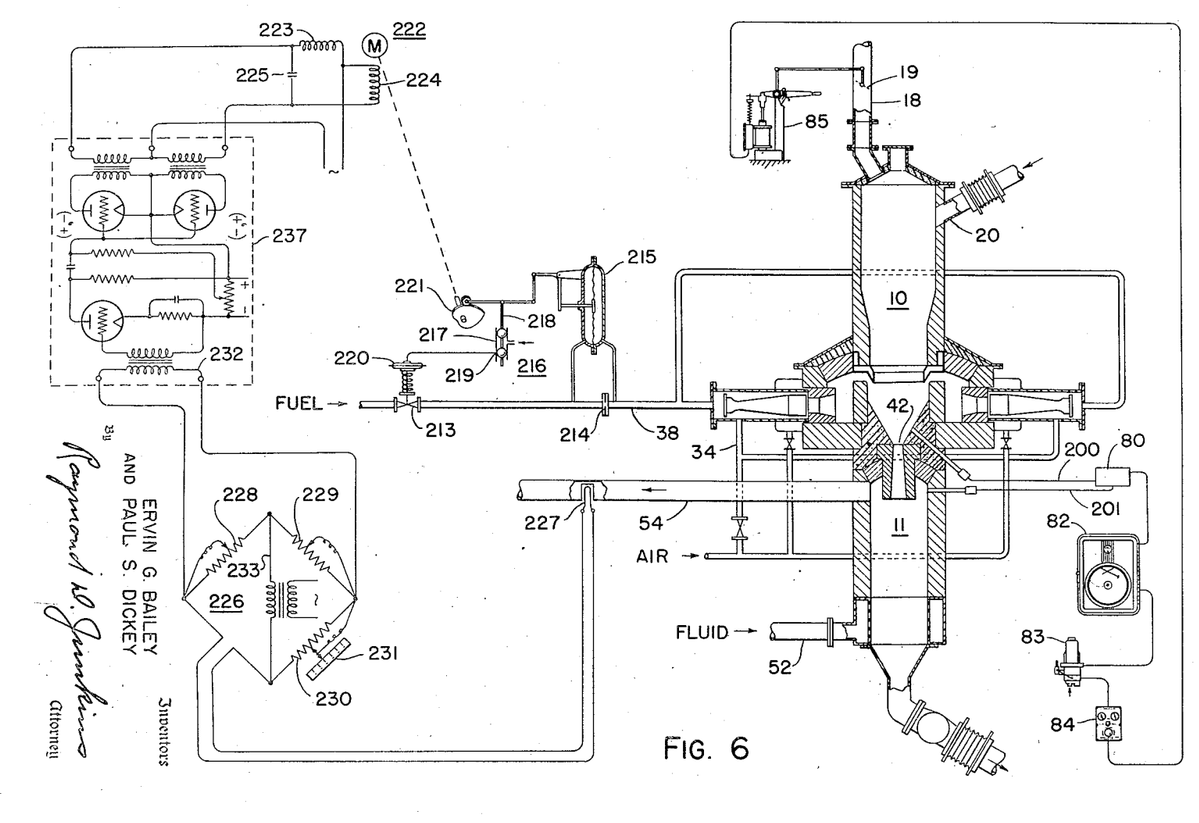
Fig. 6 diagrammatically illustrates one control system embodiment of our invention.

As diagrammatically illustrated in Fig. 6, the control system may include a differential pressure control responsive to the pressure differential at vertically spaced points in or at opposite sides of the throat 42 for regulating the exit of gaseous fluid from the upper or lower chamber to establish the desired relation between the pressure conditions in the two chambers. Damper regulation of the heating gas outflow from the upper chamber is ordinarily preferred, because of the lower temperature conditions at that point. Differential pressure control apparatus diagrammatically illustrated comprises a transmitter 80 responsive to the pressure differential between the lower part of the upper chamber 10 and the fluid space at the top of the lower chamber 11, and a receiver recorder-controller 82. An air loading pressure is established by the controller 82 representative of the pressure differential and is transmitted to a standardizing relay 83, which establishes a control pressure then transmitted to a selector valve 84 and thence to a servo-motor 85 arranged to operate a damper 19 in the heating gas outlet 18.

The arrangement is such that upon a departure of the pressure differential from the desired value an immediate and proportional change takes place in the position of the damper 19 in a direction tending to restore the pressure condition in the upper chamber to the desired relative value. Thereafter the standardizing relay operates to gradually position the damper 19 until the pressure in the upper chamber reaches the predetermined desired value. The standardizing relay 83 is of a type described and claimed in Patent 2,098,914 to Harvard H. Gorrie, while the selector valve 84 is described and claimed in Patent 2,202,485 to E. W. Fitch. The selector valve provides a convenient means for transferring operation of the damper 19 from automatic to manual control if that is desired in starting up or on shutting down the unit.

In Fig. 7 we illustrate the device 80 to larger scale. A particular problem presents itself in measuring or obtaining response to the pressure differential across the throat 42 in that while the fluid in the chamber 10 is usually a substantially dry flue gas the fluid within the chamber 11 may be a condensable vapor or gas, such for example as steam, naptha, or the like. Thus particular precautions must be taken in the design, construction and installation of the pressure differential responsive device 80 to prevent the possibility of error of measurement caused by false pressure heads produced by condensed vapor in the piping between the point of connection to the chamber 11, and possibly in the device 80 itself. Preferably the device 80 is located at or above the elevation of the pipe 201 connecting it to the chamber 11.

The device 80 is enclosed with a housing 203 capable of withstanding pressures of the order of fifty inches of water, although of course the device may readily be constructed to withstand higher pressures. Within the casing 203, and sealed thereto, is an expansible-contractible metallic bellows 204 dividing the interior of the housing 203 into two chambers 205 and 206. The pipe 200 connects the chamber 10 with the chamber 206, while the pipe 201 connects the chamber 11 with the chamber 205.

Positioned by and with the bellows 204 is an extension arm 207 carrying at its upper end a magnetic core piece 208 positionable relative to coil windings 209, 210 and 211. The core 208 and windings 209, 210, 211 cooperate to form the transmitter of a telemetric system, such as is described and claimed in the copending application of Anthony J. Hornfeck, Serial No. 453,488, now Patent No. 2,420,539. While we have shown the windings only diagrammatically, it will be appreciated that they would probably be constructed in the form of concentric or end-to-end cylinders surrounding the core piece 208. The pressure differential across the connections 200 and 201 is balanced by a spring 212, which is initially under slight tension and therefore able to move in tension or compression and allow the instrument to work in either direction from a neutral or balanced condition, namely, zero differential pressure relative to the atmosphere. In other words, the instrument is responsive to a plus or minus pressure differential between the chambers 10 and 11, the recording pen of the instrument 82 has its zero part way up on the chart and thus will indicate whether or not the pressure in the throat 42 is balanced, or whether there is a slight flow upwardly or downwardly from one chamber to the other.

In Fig. 6 we illustrate one embodiment of our invention including a constant flow control of the fuel fired to the combustion chamber 21, with the standard of the constant flow control established by temperature of the vapor leaving the chamber 11 through the conduit 54. The principal purpose of the control is to maintain vapor outlet temperature at a predetermined value, returning it to such value upon departure therefrom.

Located in the supply pipe 38 is a regulating valve 213 by which the fuel flow to the furnace 21 may be varied. Normally the rate of application of fuel is automatically maintained constant by means of a constant flow control comprising an orifice 214 disposed in the pipe 38, a differential pressure responsive device 215 responsive to the differential pressure produced by the orifice 214, and a pneumatic pilot valve generally indicated at 216, which is actuated by the responsive device 215 and acts to establish an air loading pressure for positioning the valve 213.

The pilot valve 216 may be of the type illustrated and described in Patent 2,054,464 to Clarence Johnson, and comprises a stationary valve body 217 and a relatively movable valve member 218. The valve body 217 is provided with a centrally located inlet port which may be connected with any suitable source of air under pressure. The air entering the pilot valve passes into a longitudinally located passageway past suitable lands secured to the valve member 218 and is exhausted to the atmosphere. The valve body 217 is also provided with an outlet port 219, the pressure in which will be determined by the position of the lower land on the movable valve member 218. As the valve member 218 moves downwardly the pressure established in the outlet port 219 will proportionately increase and conversely as the movable valve member 218 moves upwardly the pressure established in the outlet port 219 will decrease. The pressure so established in the outlet port is transmitted to a pressure sensitive servo-motor 220 for operating the valve 213. Assuming, by way of example, that the flow of fuel through the pipe 38 increases, the movable valve member 218 will be moved upwardly, thereby decreasing the loading pressure in the outlet port 219, and serving to position the valve 213 in a closing direction, thereby tending to return the flow of fuel to the desired rate. At decrease in fuel flow will serve to position the valve member 218 downwardly, thereby increasing the loading pressure effective on the servo-motor 220, positioning valve 213 in an opening direction and again serving to return the flow of fuel to the desired value.

The movable valve member 218 is also arranged to be positioned by a cam 221, which serves to establish the desired rate of fuel flow thereafter maintained by the constant flow control. In accordance with our invention the cam 221 is automatically positioned by means responsive to the temperature of the vapor leaving the chamber 11 through the conduit 54 to maintain the temperature of the leaving vapor at a predetermined or desired value. The constant flow control serves the purpose of correcting for changes in the rate of fuel flow, due to variations in fuel pressure, etc. before such changes cause undesirable changes in the temperature of the vapor leaving the chamber 11. In general, it may be said that the temperature responsive apparatus acts to set the control point or standard of the flow control, and thereafter the flow control operates to maintain the actual rate of fuel flow at the control point or standard.

The cam 221 is positioned by a capacitor-run alternating current motor 222 having a wound rotor and stator windings 223 and 224, the latter constituting running coils electrically ninety degrees apart. The motor is provided with a capacitor or condenser 225, which, when the motor is rotating, is in series with either the winding 223 or the winding 224, depending upon the desired direction of rotation. Such a motor runs as a two-phase alternating current motor, and not only may be reversed as to direction of rotation, but is susceptible of speed control when rotating in either direction. While in the present description we have not complicated the drawings by showing the circuit arrangement necessary for such speed control, it will be appreciated that such is possible. The circuit in general is disclosed and claimed in the copending application of Raymond D. Junkins, Serial No. 506,634, now abandoned.

For electrical control of the motor 222 we provide an alternating current Wheatstone bridge generally indicated at 226 and having as arms the resistance 227 and adjustable resistances 228, 229 and 230. The resistance 227 is diagrammatically shown as located in a well or socket in the conduit 54 and has an electrical resistance value varying with temperature of the vapor or fluid leaving the chamber 11 through the conduit 54. Thus the resistance 227 constitutes a variable resistance representative of temperature and forming one arm of the bridge 226. Hand adjustable resistances 228 and 229 provide means for calibrating and adjusting the circuit including the alternating current Wheatstone bridge. The hand adjustable resistance 230 including an indicating scale 231, provides a ready means for establishing the temperature standard (of the vapor outflow) which the system is to maintain.

Variations in electrical resistance of the element 227 (produced by variations in temperature of the vapor outflow) results in an unbalance of the bridge 226 as to polarity or phase of the current in the conjugate conductor 232, with respect to the polarity or phase of the current produced by the source 233. We employ this change in polarity or phase, through an amplifier 237, to selectively operate the motor 222 in one direction or the other to vary the position of the cam 221.

We have shown the mechanical connection between the motor 222 and cam 221 diagrammatically, it being understood that suitable reducing gears, etc. may be employed so that the cam 221 is normally positioned between suitable angular limits of less than 360° over the operating range of the control apparatus. When the temperature of the outflowing vapor (as reflected by the resistance value 227) is at the desired value then the cam 221 will be in predetermined position and the system in equilibrium.

Should the rate of supply of fuel through the conduit 38 vary for any reason, such for example as variations in supply pressure, then the pressure differential responsive device 215 will position the pilot stem 218 to slightly increase or decrease the opening of the control valve 213, thereby correcting the rate of supply of fuel to the flow rate value which is desirably to be maintained constant. This for any fixed position of the cam 221 representative of a predetermined temperature of the vapor outflow past the resistance 227.

Should the vapor outflow temperature vary in one direction or the other from the desired standard (assuming that the rate of supply of fuel has remained constant) then the consequent variation in resistance 227, and unbalance of the bridge 226 thereby, will result in the motor 222 positioning the cam 221 to slightly raise or lower the pilot stem 218 and control the valve 213 to correct the rate of fuel supply to overcome the deviation of vapor outflow temperature from desired temperature value.

The system described provides a "floating" control or effect characterized by the fact that whenever the actual temperature is other than that desired the rate of application of the corrective agent (fuel) is varied in direction tending to restore the temperature to the desired value. Thus the system will not tend to stabilize out at some vapor outflow temperature other than the desired temperature.

In general the control system provides a constant flow control of the fuel fired to the combustion chamber 21, reset from vapor outflow temperature, to maintain vapor outflow temperature at a predetermined value. The embodiment described in connection with Fig. 6 provides for a very speedy response in heat input to the pellets following any deviation in fuel supply rate or any deviation of vapor outflow temperature from desired temperature through any cause whatsoever.

Figure 8:
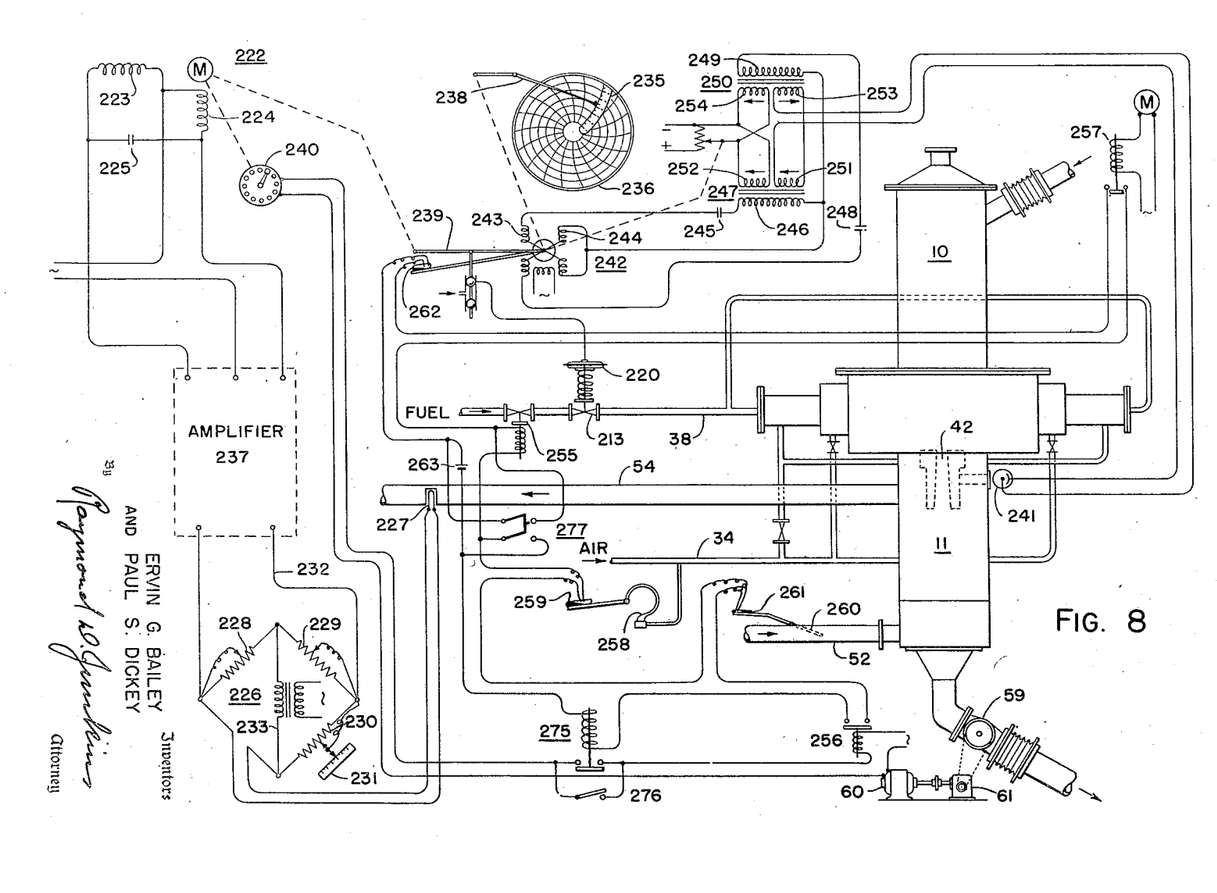
Fig. 8 diagrammatically illustrates a further embodiment of a control system, including a showing of certain interlocks or protective devices of the system.

In Fig. 8 we illustrate another embodiment of our invention, which in general utilizes vapor outflow temperature as a controlling factor for simultaneous control of the rate of supply of fuel to the combustion space 21 and of the rate of circulation of the pellets through a control of the speed of the pellet feeder 59. As we have previously pointed out, the temperature of the vapor leaving the chamber 11 may be varied either by varying the firing and thereby the temperature to which the pellets are heated, or by varying the speed of circulation of the pellets from the chamber 10 to and through the chamber 11 and thereby the rate of heat transfer from the pellets to the vapor passing through the chamber 11. In order that a check may be kept upon the temperature to which the pellets themselves are raised, we provide means sensitive to the temperature of the pellets for resetting the control valve in the fuel gas supply line.

The resistance thermometer, including the temperature sensitive element 227, is similar to that described in connection with Fig. 6 wherein departures of vapor outflow temperature from predetermined optimum temperature effect a rotation of the motor 222 in one direction or the other. The motor 222 mechanically positions one end of a floating link 239 through necessary gear or linkage reduction. The motor 222 also is connected to position the movable element of a motor control rheostat 240 regulating the speed of the motor 60 which drives the feeder 59. It is apparent that the motor 222 might equally as well be connected to vary the actuation of the speed reducer 61 between the motor 60 and the feeder 59. Thus it will be seen that the motor 222, sensitive to temperature of the vapor outflow through the conduit 54, is simultaneously effective in varying the rate of feed of the pellets out of the chamber 11 and upon the control valve 213 for the fuel supply to the combustion chamber 21.

We provide a radiation pyrometer having a temperature sensitive element 241 arranged to look at the pellets in the throat 42. We believe that this is a logical place to obtain pellet temperature, although we might desire to arrange the radiation element 241 to look at the pellets at some point in the chamber 10 above the throat 42 or at some point in the chamber 11 below the throat 42 without limiting the scope of our invention.

For positioning the other end of the floating link 239 we provide a motor 242 having opposed pole windings 243 and 244 controlled by differentially regulating the reactance of a circuit in which they are included. Connected in circuit with the pole winding 243 is a condenser 245 and the output winding 246 of a saturable core reactor 247. Connected in circuit with the pole winding 244 is a condenser 248 and the output winding 249 of a saturable core reactor 250. The reactor 247 is provided with a control winding 251 and a separately excited adjustable bias winding 252. The reactor 250 is similarly provided with a control winding 253 and a bias winding 254 connected in parallel with the bias winding 252.

The control windings 251 and 253 are connected in series to the device 241 which produces a potential corresponding to the temperature of the pellets. While we have shown the photoelectric device 241 as comprising a photovoltaic cell disposed to look at the pellets within the throat 42 and producing a potential corresponding to the radiation emanating therefrom, it is evident that equivalent means such as a thermocouple or thermo-pile could be employed. The particular arrangement and functioning of the circuit utilizing said potential in control of the motor 242 is described and claimed in Patent 2,310,955 to Hornfeck.

A particular advantage of using the radiation type pyrometer, which we have described, is that it will have a considerably greater life than any thermocouple or resistance thermometer or other temperature sensitive element which might be of necessity inserted directly into the moving column of pellets. The temperature is extremely high and the abrasive action of refractory pellets presents a very serious problem.

In Fig. 8 we have also illustrated schematically a combination of interlocks which we have felt it advisable to provide in the operation of this type of heater in connection with the control which we have invented.

1. Should the feeder 59 stop, with consequent stoppage of circulation of the pellets through the chambers 10 and 11, it is desirable that the heating be discontinued.

2. Should the supply of vapor to the chamber 11 be interrupted, then the heating should be diminished or discontinued and the feeder stopped.

3. Should the pressure of the air supplied for combustion decrease below a predetermined minimum then the heating should be discontinued.

4. Should the elevator stop, and thus the circulation of pellets be interrupted, the heating should be discontinued and the feeder stopped.

5. If the pellet temperature, as measured by the radiation pyrometer, reaches an upper limit, then the heating should be discontinued.

A practical way of discontinuing the heating is, of course, to shut off the supply of fuel through the conduit 38 to the combustion chamber 21. We therefore show positioned in the fuel line 38 a solenoid actuated valve 255 adapted to shut off the supply of fuel to the furnace when the solenoid is deenergized.

In the control circuit of the feeder motor 60 we illustrate a relay 256 adapted to become deenergized and thus open a circuit when the motor 60 is not receiving running current. In the motor circuit of the elevator motor we illustrate a solenoid 257 arranged to be deenergized and thus open a circuit when the elevator motor is not receiving running current. Connected to the air supply pipe 34 we illustrate a Bourdon tube 258 sensitive to pressure of the air and for mechanically actuating a mercury switch 259 to open the circuit of said mercury switch when the air pressure decreases below a certain value. We have indicated in connection with the vapor supply conduit 52 a butterfly type flow indicator 260 adapted to break an electric circuit, through a mercury switch 261, when flow of vapor through the conduit 52 decreases below a predetermined minimum. We illustrate the motor 242, positioned responsive to the radiation pyrometer, being adapted to actuate a mercury switch 262 to open an electric circuit when the temperature of the pellets reaches a predetermined high value.

In Fig. 8 we have shown the system in a nonoperating condition with the hand actuated switches 276 and 277 open, the solenoid valve 255 deenergized and closed, and no flow of liquid entering through the conduit 52. The relay 275 is deenergized and open circuited. The relays 256 and 257 are deenergized and open circuited. Pressure of the air for combustion is below a predetermined minimum so that the mercury switch 259 is open circuited. The mercury switches 261 and 262 are both shown in open circuited condition.

In general, the solenoid valve 255 is normally energized from a source of power 263 and held open for free flow of fuel through the conduit 38. Any one of the safety devices 261, 256, 257, 259 or 262 is arranged to open the circuit of the solenoid valve 255 and cause that valve to close off the supply of fuel to the furnace. Thus under any one of the predetermined emergency operating conditions the heating, as represented by the supply of fuel to the furnace, will be discontinued and avoid a dangerous temperature condition within the chambers 10 or 11 or the throat 42.

Under certain conditions it is desirable to stop the pellet feeder 59 and we have therefore included a relay 275 in the control circuit of the motor 60. Under normal operating conditions the circuit closer of the relay 275 is at closed circuit position. In the event of emergency condition then the relay 275 becomes deenergized and the motor control circuit for the motor 60 is opened. In order that the motor 60 may be started by hand we provide a switch 276 by-passing the relay contact 275.

At 277 we provide a hand switch for holding open the solenoid valve 255 in the fuel supply line so that the system may be started by initiating combustion in the chamber 21.

Figure 9:
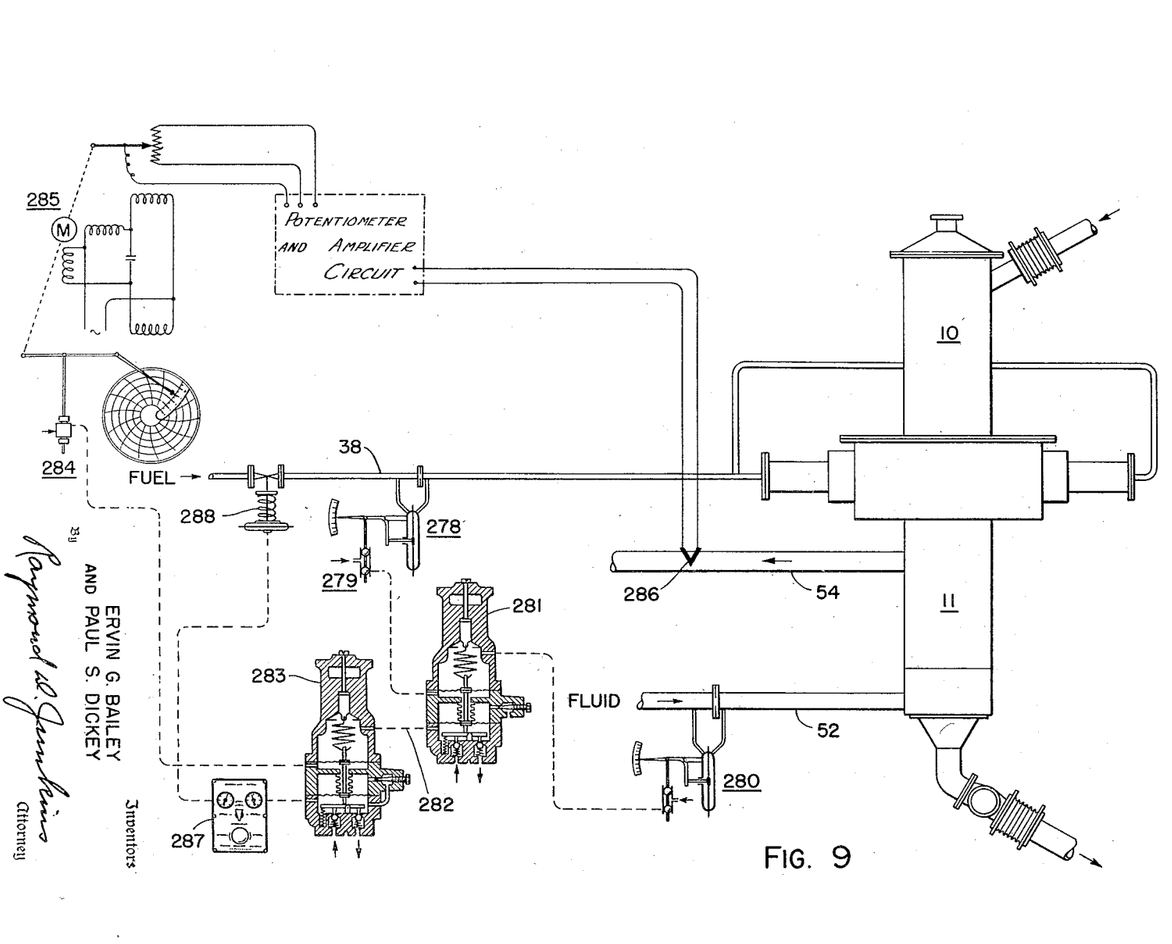
Fig. 9 is a diagrammatic view of a three-element control system.

In Fig. 9 we illustrate a three-element type of control arrangement wherein rate of fuel supply is balanced against rate of supply of the fluid entering the chamber 11 to be heated. Such relationship is readjusted or modified, if necessary, in accordance with the temperature of the fluid leaving the chamber 11 after it has been heated.

A differential pressure responsive device 278, similar to the device 215 of Fig. 6, is arranged to position the pilot valve 279 to establish a loading pressure representative of the rate of supply of fuel to the combustion chamber 21. In similar manner a differential pressure responsive device 280 establishes a loading pressure representative of the rate of supply of fluid to the chamber 11 through the conduit 52.

The loading pressures mentioned are transmitted to a ratio relay 281 producing a loading pressure in the pipe 282 representative of the relation between, or ratio of, the two rates of flow.

Such loading pressure is effective within a chamber of the standardizing relay 283. To this relay is also conducted a loading pressure established by the pilot 284 representative of temperature of the fluid leaving the chamber 11 through the conduit 54. The pilot 284 is positioned by a motor 285 under the control of an electrical network including a thermocouple 286. The thermocouple circuit for control of the motor 285 may be a known potentiometric and amplifying circuit.

From the standardizing relay 283 the loading pressure is effective (through a selector valve 287) in positioning a control valve 288 regulating the rate of supply of fuel to the combustion chamber 21.

In general, the system illustrated in Fig. 9 balances the rate of supply of fuel (for heating the pellets in the chamber 10) against the rate of supply of fluid to be heated entering the chamber 11 through the conduit 52. If the B. t. u. value of the fuel, the temperature of the fluid entering through the conduit 52, and other variables remain constant, then the rate of supply of fuel proportioned to the rate of supply of fluid to be heated could adequately regulate the valve 288.

The tie-back, or third element, in the system is the use of the final result, namely, temperature of the fluid after it has been heated in the chamber 11. By modifying the control of the valve 288 from this fluid outlet temperature we incorporate in the control of the valve 288 any modification which is necessary to satisfy variables in the operation of the system.

While in the arrangement of Figs. 6 and 8 we have illustrated the temperature element 227 as a resistance type it will be appreciated that this might equally as well be the thermocouple type illustrated at 286 of Fig. 9. The choice as between resistance element or thermocouple (with the necessary circuit arrangement in connection therewith) depends to a great extent upon the temperature range expected.

While we have illustrated and described certain preferred embodiments of our invention, it will be understood that these are illustrative only and that the salient features of the invention may be carried out in other manner and with other apparatus than those specifically described.

This application constitutes a division of our copending application S. N. 506,630 filed October 18, 1943, now Patent No. 2,417,049 reissued as Re. 23,087.

What we claim as new, and desire to secure by Letters Patent of the United States, is:

1. The combination with a fluid heater having an upper chamber enclosing a fluent mass of solid material, a lower chamber enclosing a fluent mass of solid material, a passage forming a throat between said upper and lower chambers and enclosing a column of fluent solid material connecting said masses, means external of said chambers and throat arranged to return solid material from an exit in the lower chamber to an inlet to the upper chamber, a fuel supply means for heating the solid material in the upper chamber, a supply of fluid to be heated passing through the lower chamber in direct contact with the heated solid material therein, constant flow rate means adapted to maintain the fuel supply rate constant, and means responsive to temperature of the heated fluid leaving the lower chamber adapted to establish the rate of fuel supply to which the constant rate means controls.

2. The combination with a fluid heater having an upper chamber enclosing a fluent mass of solid material, a lower chamber enclosing a fluent mass of solid material, a passage forming a throat between said upper and lower chambers and enclosing a fluent mass of solid material connecting said material masses, means producing a substantially continuous downward flow of the material through the upper chamber, throat and lower chamber, a fuel supply means for heating the material in the upper chamber, a supply of fluid to be heated passed through the lower chamber in direct contact with the heated material therein, means measuring the rate of supply of fuel, means measuring the rate of supply of fluid to be heated, and means conjointly responsive to said measuring means adapted to control the rate of supply of fuel.

3. The combination of claim 2 including, means responsive to temperature of the heated fluid leaving the lower chamber adapted to modify the control of the rate of supply of fuel.

4. The combination with a fluid heater having an upper chamber enclosing a fluent mass of solid material, a lower chamber enclosing a fluent mass of solid material, a passage forming a throat between said upper and lower chambers and enclosing a fluent mass of solid material connecting said material beds, means producing a substantially continuous downward movement of the pellets through the upper chamber, throat and lower chamber, means for supplying a heating medium to the upper chamber, a supply of fluid to be heated passed through the lower chamber in direct contact with the heated material therein, means measuring the rate of supply of heating medium, means measuring the rate of supply of fluid to be heated, means determining the temperature of the fluid leaving the lower chamber, and control means conjointly sensitive to said measuring means and determining means and adapted to control the rate of supply of the heating medium.

5. The combination with a fluid heater having an upper chamber enclosing a fluent mass of refractory pellets, a lower chamber enclosing a fluent mass of refractory pellets, a passage forming a throat between said upper and lower chambers and enclosing a fluent mass of refractory pellets connecting said pellet masses, means producing a substantially continuous downward movement of the pellets through the upper chamber, throat and lower chamber, means for supplying a heating medium to the upper chamber, a supply of fluid to be heated passed through the lower chamber in direct contact with the heated pellets therein, means measuring the rate of supply of heating medium, means measuring the rate of supply of fluid to be heated, means establishing a fluid loading pressure continuously representative of the relation between said rates, means establishing a fluid loading pressure continuously representative of the temperature of the fluid after it has been heated in the lower chamber, and means regulating the supply of heating medium responsive to both said loading pressures.

6. The combination with a fluid heater having an upper chamber enclosing a fluent mass of solid material, a lower chamber enclosing a fluent mass of solid material, a passage forming a throat between said upper and lower chambers and enclosing a fluent mass of solid material connecting said material masses, means producing a substantially continuous downward flow of the material through the upper chamber, throat and lower chamber, heating medium supply means for heating the material in the upper chamber, a supply of fluid to be heated passed through the lower chamber in direct contact with the heated material therein, means responsive to variations in the rate of supply of heating medium arranged to so control the said rate of supply to prevent variations from a standard rate, and means responsive to variations in the temperature of the heated fluid leaving the lower chamber adapted to establish the value of the said standard rate.

7. The combination with a fluid heater having an upper chamber enclosing a fluent mass of solid material, a lower chamber enclosing a fluent mass of solid material, a passage forming a throat between said upper and lower chambers and enclosing a fluent mass of solid material connecting said material masses, means producing a substantially continuous downward flow of the material through the upper chamber, throat and lower chamber, a heating medium supply means for heating the material in the upper chamber, a supply of fluid to be heated passed through the lower chamber in direct contact with the heated material therein, means establishing a fluid loading pressure representative of rate of supply of heating medium, means responsive to deviations in temperature of the heated fluid leaving the lower chamber from a preselected value for modifying said loading pressure, and control means sensitive to the modified loading pressure adapted to control the rate of supply of heating medium.

8. The combination with a fluid heater having an upper chamber enclosing a fluent mass of solid material, a lower chamber enclosing a fluent mass of solid material, a passage forming a throat between said upper and lower chambers and enclosing a fluent mass of solid material connecting said material masses, means producing a substantially continuous downward flow of the material through the upper chamber, throat and lower chamber, a fuel supply means for heating the material in the upper chamber, a supply of fluid to be heated passed through the lower chamber in direct contact with the heated material therein, means measuring the rate of supply of the fluid to be heated, means measuring the temperature of the fluid after it has been heated, and means conjointly responsive to said measuring means adapted to control the rate of supply of fuel.

9. The method of operating apparatus having an upper chamber enclosing a fluent mass of solid material, a lower chamber enclosing a fluent mass of solid material, and a throat of reduced cross-section connecting the upper and lower chambers and enclosing a fluent mass of the solid material connecting the upper and lower chamber masses; which includes maintaining a substantially continuous movement of solid material downwardly through the upper chamber, throat and lower chamber, continuously supplying a heating medium to the upper chamber in direct contact with the solid material therein, continuously supplying a fluid to be heated to the lower chamber in direct contact with the solid material therein, continuously measuring the rate of supply of the heating medium, continuously measuring the rate of supply of the fluid to be heated, continuously measuring the temperature of the fluid after it has been heated in the lower chamber, and controlling the rate of supply of the heating medium in accordance with the combined effects of the two rates of supply and the temperature.

ERVIN G. BAILEY.
PAUL S. DICKEY.

REFERENCES CITED

The following references are of record in the file of this patent:

UNITED STATES PATENTS

| Number | Name | Date |
| --- | --- | --- |
| 2,301,898 | Luhrs | Nov. 10, 1942 |
| 2,332,868 | Nowak | Oct. 26, 1943 |
| 2,379,457 | Ricker | July 3, 1945 |
| 2,417,049 | Bailey et al. | Mar. 11, 1947 |
| 2,447,306 | Bailey et al. | Aug. 17, 1948 |